(12) United States Patent
Chen et al.

(10) Patent No.: US 8,942,172 B2
(45) Date of Patent: Jan. 27, 2015

(54) METHOD FOR POSITIONING MOBILE DEVICE IN WIRELESS WIDE AREA NETWORK

(71) Applicant: Novatek Microelectronics Corp., Hsinchu (TW)

(72) Inventors: Chien-Sheng Chen, Kaohsiung (TW); Yung-Chuan Lin, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 132 days.

(21) Appl. No.: 13/650,136

(22) Filed: Oct. 12, 2012

(65) Prior Publication Data

US 2013/0329581 A1 Dec. 12, 2013

(30) Foreign Application Priority Data

Jun. 7, 2012 (TW) .............................. 101120520 A

(51) Int. Cl.
*H04W 64/00* (2009.01)
*G06N 3/12* (2006.01)
*G06N 3/08* (2006.01)

(52) U.S. Cl.
CPC .............. *H04W 64/00* (2013.01); *G06N 3/086* (2013.01); *G06N 3/126* (2013.01)
USPC ....................................... 370/328; 455/456.1

(58) Field of Classification Search
USPC ......... 370/328; 455/404.2, 440, 456.1, 456.2, 455/456.3, 456.4, 456.5, 456.6
See application file for complete search history.

(56) References Cited

U.S. PATENT DOCUMENTS

| | | | | |
|---|---|---|---|---|
| 6,249,252 | B1* | 6/2001 | Dupray | 342/450 |
| 8,117,139 | B2 | 2/2012 | Bonabeau et al. | |
| 2002/0183069 | A1* | 12/2002 | Myr | 455/456 |
| 2011/0287778 | A1 | 11/2011 | Levin et al. | |
| 2013/0178235 | A1* | 7/2013 | Chen et al. | 455/456.5 |

FOREIGN PATENT DOCUMENTS

EP 1770955 4/2007

OTHER PUBLICATIONS

Chen et al., An Efficient Geometry-Constrained Location Estimation Algorithm for NLOS Environments, 2005, IEEE, p. 244-249.*
Yu et al., Improved Positioning Algorithms for Nonline-of-Sight Environments, 2008, IEEE, p. 2342-2353.*
Chen et al., Enhanced Location Estimation with the Virtual Base Stations in Wireless Location Systems, 2006, p. 603-607.*
(Continued)

*Primary Examiner* — Hoon J Chung
(74) *Attorney, Agent, or Firm* — Jianq Chyun IP Office

(57) ABSTRACT

A method for positioning a mobile device in a wireless wide area network (WWAN) is provided. The method includes determining three measurement circles according to coordinates of three base stations and respectively calculating radiuses of the three measurement circles and distances between the three base stations. The method uses genetic algorithm to derive the best solution of a plurality of variables of an object function and estimates the position of the mobile device according to the best solution. Accordingly, non-line-of-sight (NLOS) errors are reduced, and more accurate positioning can be provided.

15 Claims, 7 Drawing Sheets

(56) References Cited

OTHER PUBLICATIONS

Venkatraman et al., "A novel TOA location algorithm using LOS range estimation for NLOS environments," IEEE Transactions on Vehicular Technology, vol. 53, No. 5, Sep. 2004, p. 1515-p. 1524.

"Office Action of Taiwan Counterpart Application", issued on May 9, 2014, p. 1-p. 6, in which the listed references were cited.

* cited by examiner

METHOD FOR POSITIONING MOBILE DEVICE IN WIRELESS WIDE AREA NETWORK

CROSS-REFERENCE TO RELATED APPLICATION

This application claims the priority benefit of Taiwan application serial no. 101120520, filed on Jun. 7, 2012. The entirety of the above-mentioned patent application is hereby incorporated by reference herein and made a part of this specification.

BACKGROUND

1. Field of the Invention

The invention relates to a method for positioning a mobile device, and more particularly to, a method for positioning a mobile device in a wireless wide area network (WWAN).

2. Description of Related Art

In recent years, many studies have discussed about positioning a mobile device under a wireless positioning system. Wireless positioning technology has included many methods, such as signal strength (SS), time of arrival (TOA), angle of arrival (AOA), time difference of arrival (TDOA), and so forth. The signal strength (SS) utilizes a conventional signal attenuation model to calculate distances. The time of arrival (TOA) positioning method measures a transmission time of a wireless signal between the mobile device and a base station. The angle of arrival (AOA) method utilizes a measurement of an antenna array obtaining angle of a serving base station (Serving BS). The time difference of arrival (TDOA) method measures a time difference between signal transmissions. The angle measurement at least requires two base stations and is not required to perform time synchronization. The time measurement at least requires three base stations, and even though is required to perform synchronization.

Wireless positioning technology has many applications including an emergency rescue and an intelligent transportation system. The emergency rescue requires accurately knowing a telephone number and a position of an assistance recipient; while, the intelligent transportation system is the transportation system of the next generation which combines traditional transportation system, electronic technology, control, computer, and management strategy. The intelligent transportation system utilizes the positioning technology to enhance efficiency and safety of the transportation system, reduce traffic congestion and improving charge reliably.

Non-line-of-sight (NLOS) is considered to be a most critical factor in influencing the wireless positioning technology. Since the signal transmission is to encounter with a reflection and a diffraction, the non-line-of-sight transmission may causes errors in the time measurement and the angle measurement. For example, a system of the time measurement may measure a transmission delay time, and a system of the angle measurement may measure a direction of a scattering point or a disruptor. There once was an experiment performed under an IS-95 CDMA system, the non-line-of-sight errors are able to reach as much as up to 589 meters. Therefore, many studies are dedicated to reduce an influence of the non-line-of-sight errors.

SUMMARY OF THE INVENTION

A method is provided for positioning a mobile device in a wireless wide area network by performing iterations of a genetic algorithm to obtain a position of the mobile device.

In an aspect, a method for positioning a mobile device in a wireless wide area network is provided. The method includes determining three measurement circles according to coordinates of three base stations, and respectively calculating radiuses of the three measurement circles and distances between the three base stations. The method yet includes determining an object function. Wherein the object function is expressed with a first variable, a second variable, a third variable, and a fourth variable. The method further includes respectively determining a first variable coding range, a second variable coding range and a third variable coding range according to the radiuses of the three measurement circles and the distances between the three base stations. The method also includes determining a fourth variable coding range. The method further includes coding the first variable coding range, the second variable coding range, the third variable coding range, and the fourth variable coding range. The method yet includes selecting a plurality of combinations of the first variable, the second variable, the third variable, and the fourth variable respectively within the first variable coding range the second variable coding range, the third variable coding range, and the fourth variable coding range as a parent population of the object function. The method further includes performing iterations of a genetic algorithm by using the parent population as a basis to derive a best solution of the first variable, the second variable, the third variable, and the fourth variable for the object function. The method additionally includes converting the best solution of the first variable, the second variable and the third variable into a position of the mobile device according to the coordinates of three base stations so as to position the mobile device in the wireless wide area network.

In another aspect, a method for positioning a mobile device in a wireless wide area network is provided. The method includes determining a plurality of measurement circles according to coordinates of a plurality of base stations, and respectively calculating radiuses of the plurality of measurement circles and distances between the plurality of base stations. The method yet includes determining an object function. The object function is expressed by a plurality of variables. The method additionally includes respectively determining a plurality of variable coding ranges according to the radius of the plurality of measurement circles and the distances between the plurality of base stations. The method further includes determining another variable coding range. The method yet includes coding the plurality of variable coding ranges. The method additionally includes selecting a plurality of combinations of the plurality of variables respectively within the plurality of variable coding ranges as a parent population of the object function. The method further includes performing iterations of a genetic algorithm using the parent population as a basis to derive a best solution of the plurality of variables for the object function. The method additionally includes converting the best solution of at least a part of the variables in the plurality of variables into a position of the mobile device according to the coordinates of the plurality of base stations so as to position the mobile device in the wireless wide area network.

In an embodiment of the invention, steps of determining the three measurement circles according to the coordinates of three base stations include estimating distances from the mobile device to the three base stations by measuring signals between the mobile device and the three base stations, and determining the three measurement circles by respectively using the coordinates of three base stations as centers of the three measurement circles and the estimated distances as the radiuses of the three measurement circles.

In an embodiment of the invention, steps of determining the object function include determining a function f(v) according to the radiuses of the three measurement circles, coordinates of three interception points of the three measurement circles and the coordinates of three base stations, and determining a constraint g(v) according to the radiuses of the three measurement circles and the distances between the three base stations. Wherein, the first variable, the second variable, the third variable, and the fourth variable are respectively expressed with α, β, γ, and λ, while the object function is $F(\alpha,\beta,\gamma,\lambda)=f(v)+\lambda \times g(v)$, and $v=[\alpha\ \beta\ \gamma]^T$.

In an embodiment of the invention, the radiuses of the three measurement circles are $r_1$, $r_2$ and $r_3$ respectively, the distances between the three base stations are $L_{12}$, $L_{13}$ and $L_{23}$ respectively, the first variable coding range is $\alpha_{min}$ to 1, the second variable coding range is $\beta_{min}$ to 1, and the third variable coding range is $\gamma_{min}$ to 1. Wherein, $[\alpha_{min}\ \beta_{min}\ \gamma_{min}]^T = [1,_{min}{}^2\ \alpha_{2,min}{}^2\ \alpha_{3,min}{}^2]^T$, $\alpha_{1,min}$ is the larger of $$\frac{L_{12}-r_2}{r_1} \text{ and } \frac{L_{13}-r_3}{r_1},$$

$\alpha_{2,min}$ is larger of $$\frac{L_{12}-r_1}{r_2} \text{ and } \frac{L_{23}-r_3}{r_2},$$

and $\alpha_{3,min}$ is the larger of $$\frac{L_{13}-r_1}{r_3} \text{ and } \frac{L_{23}-r_2}{r_3}.$$

In an embodiment of the invention, steps of coding the first variable coding range, the second variable coding range, the third variable coding range, and the fourth variable coding range include expressing $(2^M-1)$ segments between $\alpha_{min}$ to 1 with M bits, expressing $(2^N-1)$ segments between $\beta_{min}$ to 1 with N bits, expressing $(2^O-1)$ segments between $\gamma_{min}$ to 1 with O bits, and expressing $(2^P-1)$ segments between $\lambda_{min}$ to $\lambda_{max}$ with P bits. Wherein, the fourth variable coding range is $\lambda_{min}$ to $\lambda_{max}$, and M, N, O, and P are positive integers.

In an embodiment of the invention, M is equal to N and O, and P is greater than M, N and O.

In an embodiment of the invention, steps of performing the iterations of the genetic algorithm by using the parent population as the basis include: (a) performing one or more of a chromosome reproduction processing, a crossover processing and a mutation processing on the combinations in the parent population to generate a plurality of combinations of the first variable, the second variable, the third variable, and the fourth variable in a sub-population; and (b) using the sub-population as a next generation of the parent population and repeating step (a) until a predetermined number of the iterations is achieved.

In an embodiment of the invention, the reproduction processing includes respectively substituting the combinations in the parent population into the object function to derive an operand value of each combination, and replicating the combinations from the parent population as a portion of the combinations in the sub-population according to probabilities corresponding to the operand values of the combinations.

In an embodiment of the invention, the combinations with smaller operand values have larger probabilities of being selected from the parent population to perform replication.

In an embodiment of the invention, the crossover processing includes randomly selecting two combinations from the combinations in the parent population, and interchanging local codings within the two selected combinations to generate two combinations in the sub-population.

In an embodiment of the invention, the mutation processing includes randomly selecting at least one combination from the combinations with the parent population, and phase reversing at least one bit within the at least one combination to generate a combination in the sub-population.

In an embodiment of the invention, steps of determining the plurality of measurement circles according to the coordinates of the plurality of base stations include estimating distances from the mobile device to the plurality of base stations by measuring signals between the mobile device and the plurality of base stations, and determining the plurality of measurement circles by respectively using the coordinates of plurality of base stations as centers of the three measurement circles and the estimated distances as the radiuses of the three measurement circles.

In an embodiment of the invention, steps of determining the object function include determining a function f(v) according to the radiuses of the plurality of measurement circles, and the coordinates of plurality of base stations and coordinates of a plurality of interception points of the plurality of measurement circles, determining a constraint g(v) according to the radiuses of the plurality of measurement circles and the distances between the plurality of base stations, and determining the object function according to the function f(v) and the constraint g(v).

In an embodiment of the invention, steps of performing the iterations of the genetic algorithm using the parent population as the basis include: (a) performing one or more of a chromosome reproduction processing, a crossover processing and a mutation processing on the combinations in the parent population to generate a plurality of combinations of the plurality of variables in a sub-population; and (b) using the sub-population as a next generation of the parent population and repeating step (a) until a predetermined number of the iterations is achieved.

According to the foregoing, the method of the embodiments utilizes the genetic algorithm, under non-line-of-sight errors, to estimate the position of the mobile device. Through the iterations, the genetic algorithm can find the best solution from the object function. Thus, an influence of the non-line-of-sight errors may be reduced, and a more accurate positioning may be provided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
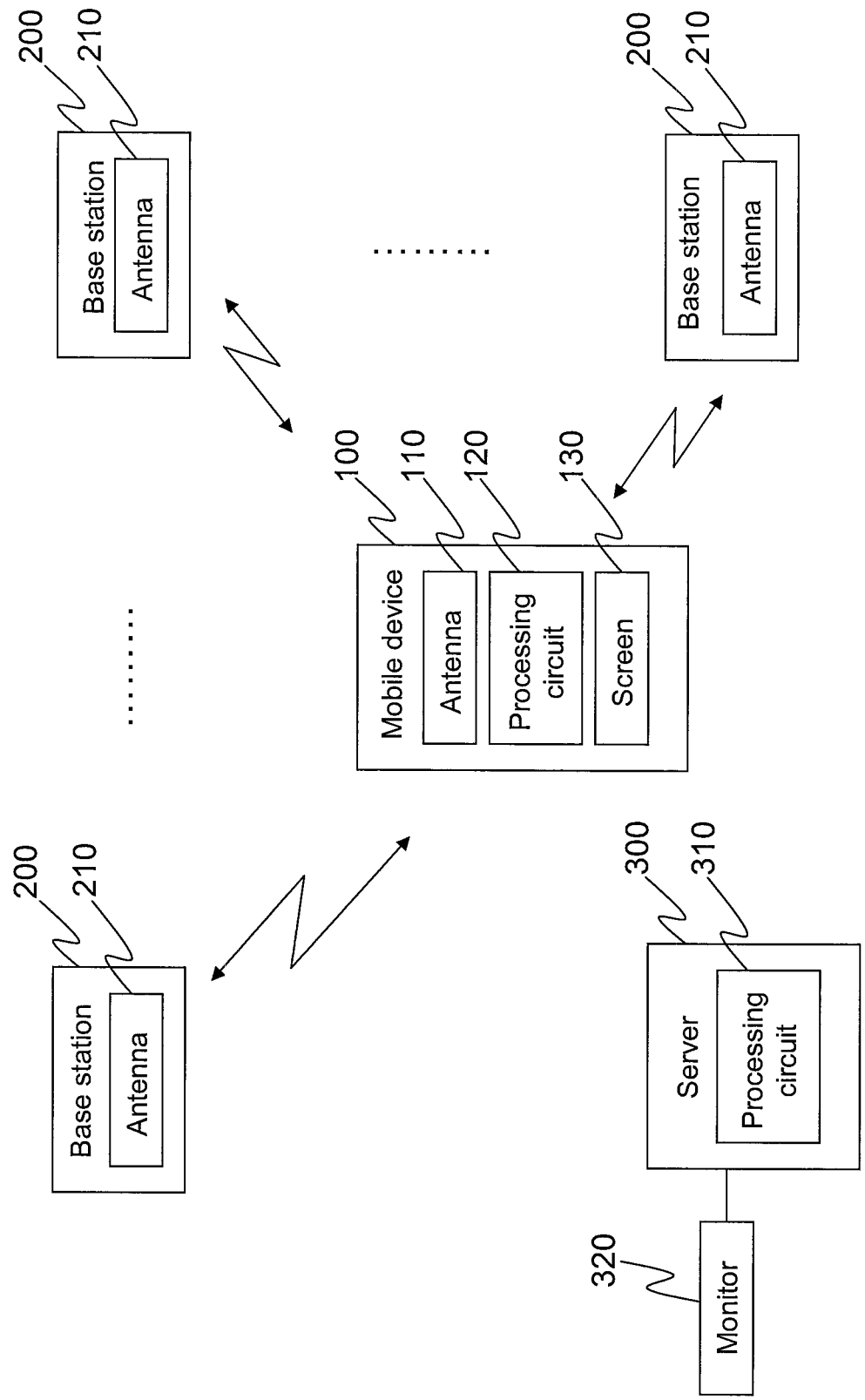
FIG. 1 is illustrated to describe a method for positioning a mobile device according to an embodiment of the invention.

Referring to FIG. 1, FIG. 1 is illustrated to describe a method for positioning a mobile device 100 according to an embodiment of the invention. The mobile device 100 positions within a service range of a plurality of base stations 200. The mobile device 100 and the base stations 200 through antennas 110 and 210 thereof may wirelessly communicate with each other. The mobile device 100 and the base stations 200 form a wireless wide area network, in which a communication protocol is adopted as a wireless wide area network communication protocol. The wireless wide area network communication protocol may be but not limited to Wide Band Code Division Multiple Access (WCDMA) protocol, Enhanced Data rates for GSM Evolution (EDGE) protocol, General Packet Radio Service (GPRS) protocol, Code Division Multiple Access 2000 (CDMA 2000) protocol, 1 carrier Evolution-Data Optimized (1xEV-DO) protocol, and High-Speed Downlink Packet Access (HSDPA) protocol.

In the present embodiment, the mobile device 100 additionally includes a processing circuit 120 for executing the method in order to position the mobile device 100. Moreover, the mobile device 100 may further include a screen 130 coupled to the processing circuit 120 for displaying a position of the mobile device 100 after a positioning. In an embodiment of the invention, the screen 130 displays a correlation map of the position of the mobile device 100, and marks the position of the mobile device 100 on the map.

Moreover, the method of the invention is not limited to perform by the mobile device 100. In another embodiment of the invention, the method is executed by a processing circuit 310 of a server 300 for positioning the mobile device 100. Before the processing circuit 310 positions the mobile device 100, relevant information between the mobile device 100 and each base station 200 may be received from the base stations 200. Afterward, the processing circuit 310 executes the method according to the obtained relevant information to position the mobile device 100. In an embodiment of the invention, after the mobile device 100 is positioned by the processing circuit 310, the server 300 may transmit the position of the mobile device 100 to the mobile device 100 via the base stations 200, and enable the screen 130 of mobile device 100 to display the position of the mobile device 100 after being positioned by the processing circuit 310. Moreover, in an embodiment of the invention, the server 300 is coupled to a monitor 320, and the position of the mobile device 100 may be displayed on the monitor 320. In an embodiment of the invention, the processing circuit 310 of the server 300 may simultaneously position a plurality of mobile devices and simultaneously display positions of the plurality of mobile devices on the monitor 320.

In the present embodiment, the mobile device 100 is a mobile phone, but the invention is not limited thereto. For example, in other embodiments of the invention, the mobile device 100 may be a wireless positioning device on a bus or an ambulance for locating the bus or the ambulance. Another example, the mobile device 100 may be a notebook, tablet PC, or other portable mobile device with an antenna. Moreover, the term "coupled" appeared in the entire specification (includes the claims) of the invention may be referred to any direct or indirect connection. For example, if the contents describes a first device is coupled with a second device, then it should be interpreted as that the first device may be directly connected with the second device, or the first device is indirectly connected with the second device through other device or a certain connection method.

Figure 2:
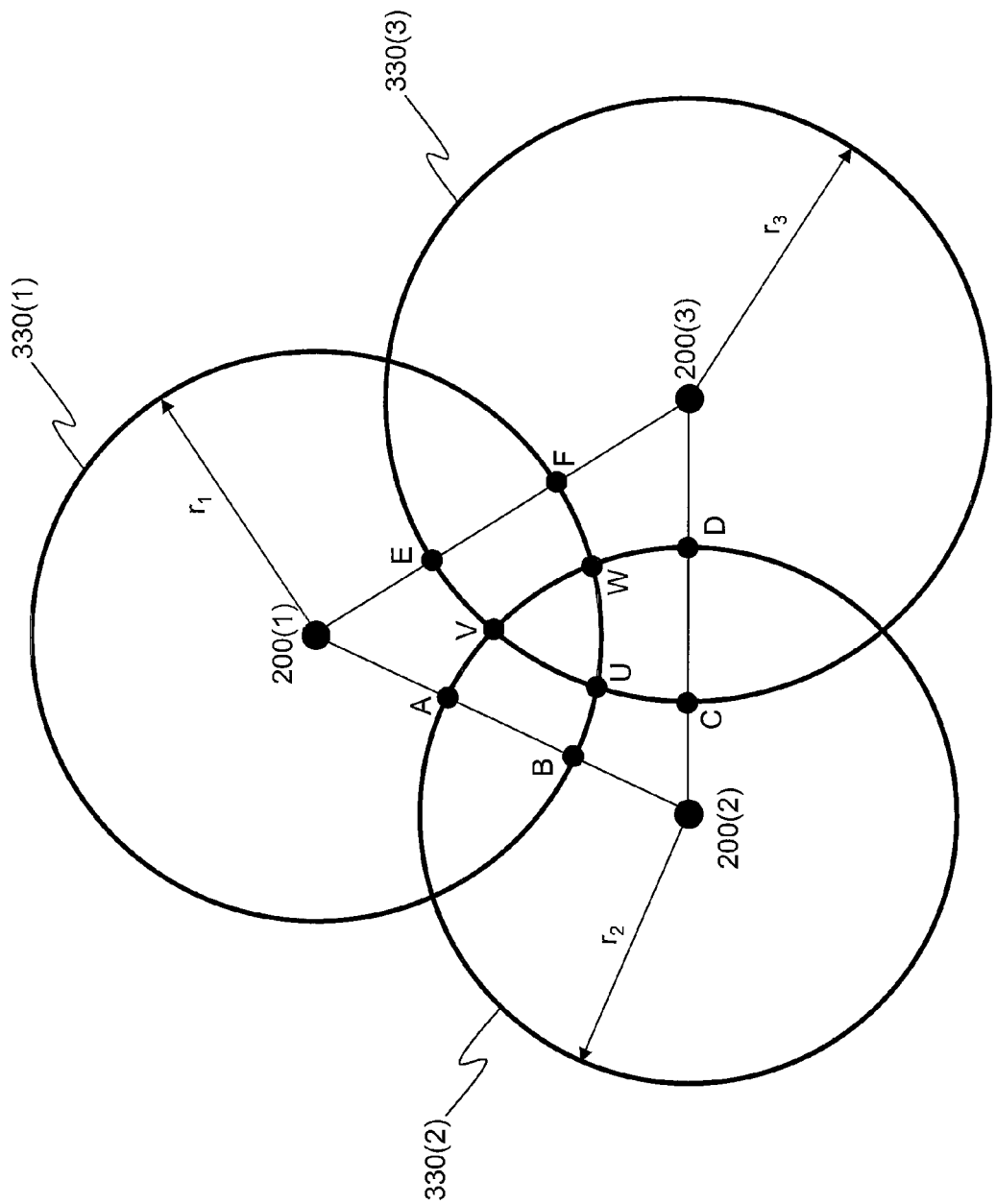
FIG. 2 illustrates three measurement circles determined in an embodiment of the invention.

In an embodiment of the invention, when the processing circuit 120 or 310 positions the mobile device 100, the processing circuit 120 or 310 determines a plurality of measurement circles according to coordinates of a plurality of base stations 200, and respectively calculates radiuses of the plurality of measurement circles and distances of the plurality of base stations 200. In the following below, three base stations and three measurement circles are taken as examples for the purpose of illustration; nevertheless, the numbers of the base station and measurement circle may be analogized. Referring to FIG. 2 and FIG. 1 at the same time, FIG. 2 illustrates three measurement circles 330(1), 330(2) and 330(3) determined in an embodiment of the invention. Wherein, the measurement circles 330(1), 330(2) and 330(3) are measurement circles of base stations 200(1), 200(2) and 200(3), respectively, and center positions of measurement circles 330(1), 330(2) and 330(3) are coordinates of the base stations 200(1), 200(2) and 200(3), respectively. Herein, assumes that the coordinates of the three base stations 200(1)-200(3) are (x1,y1), (x2,y2) and (x3,y3), respectively, a distance between the base station 200(1) and the base station 200(2) is $L_{12}$, a distance between the base station 200(1) and the base station 200(3) is $L_{13}$, and a distance between the base station 200(2) and the base station 200(3) is $L_{23}$, then the distances may be respectively expressed by the following Equations (1) to (3):

$$L_{12} = \sqrt{(x_1-x_2)^2+(y_1-y_2)^2} \qquad (1)$$

$$L_{13} = \sqrt{(x_1-x_3)^2+(y_1-y_3)^2} \qquad (2)$$

$$L_{23} = \sqrt{(x_2-x_3)^2+(y_2-y_3)^2} \qquad (3)$$

When the processing circuit 120 or 310 determines the measurement circles 330(1), 330(2) and 330(3), signals between the mobile device 100 and the base stations 200(1) to 200(3) are measured by the mobile device 100 or the base stations 200(1) to 200(3), and distances from the mobile device 100 to the three base stations 200(1) to 200(3) are estimated according to the measured signals. An estimating method of the distances from the mobile device 100 to the three base stations 200(1) to 200(3) may include but not limit to signal strength (SS), time of arrival (TOA), time difference of arrival (TDOA), and the similar measuring methods. Moreover, the estimated distances from the mobile device 100 to the three base stations 200(1) to 200(3) are radiuses $r_1$, $r_2$ and $r_3$ of the measurement circles 330(1), 330(2) and 330(3), respectively. In absence of any measurement error, the three measurement circles 330(1) to 330(3) would intersect at a same point, and this intersection point is namely a position of the mobile device 100. Nevertheless, due to a cause of non-line-of-sight errors (NLOS), the estimated distances from the mobile device 100 to the three base stations 200(1) to 200(3) are greater than actual distances from the mobile device 100 to the three base stations 200(1) to 200(3). Therefore, the three measurement circles 330(1), 330(2) and 330(3) would intersect, and the mobile device 100 is located at a region intersected by the three measurement circles 330(1) to 330(3). As shown in FIG. 2, intersection points of the measurement circles 330(1) to 330(3) are U, V and W, and the mobile device 100 is located within a region somewhat similar to a triangular shape, which has the intersection points U, V and W as vertices.

Since the measured distances are greater than the actual distances, a relationship between the actual distances Ri and the measured distance ri from the mobile device 100 to the three base stations 200(1) to 200(3) may be expressed as the following:

$$R_i = \sqrt{(x-x_i)^2 + (y-y_i)^2} = \alpha_i r_i \; i=1,2,3 \quad (4)$$

wherein, $0 < \alpha_i \leq 1$ i=1, 2, 3;
x is a horizontal coordinate of the mobile device 100;
y is a vertical coordinate of the mobile device 100;
$R_1$ is an actual distance from the mobile device 100 to the base station 200(1);
$R_2$ is an actual distance from the mobile device 100 to the base station 200(2);
$R_3$ is an actual distance from the mobile device 100 to the base station 200(3);
$r_1$ is a measured distance from the mobile device 100 to the base station 200(1);
$r_2$ is a measured distance from the mobile device 100 to the base station 200(2);
$r_3$ is a measured distance from the mobile device 100 to the base station 200(3);
$\alpha_1$ is a specific value of $R_1$ and $r_1$;
$\alpha_2$ is a specific value of $R_2$ and $r_2$; and
$\alpha_3$ is a specific value of $R_3$ and $r_3$.
Equation (4) is expanded to obtain:

$$(x-x_i)^2 + (y-y_i)^2 = \alpha_i^2 r_i^2 \; i=1,2,3 \quad (5)$$

For the convenience of the descriptions below, a transfer matrix v is established as follows:

$$v = [\alpha \beta \gamma]^T = [\alpha_1^2 \alpha_2^2 \alpha_3^2]^T \quad (6)$$

According to Equation (6), the first variable is $\alpha = \alpha_1^2$, the second variable is $\beta = \alpha_2^2$, and the third variable is $\gamma = \alpha_3^2$.

I. Upper and Lower Limits of First Variable α, Second Variable β, Third Variable γ

Herein upper and lower limits of the first variable α, the second variable β, and the third variable γ are described. However, before the upper and lower limits of the first variable α, the second variable β, and the third variable γ are described, non-line-of-sight errors (NLoS error) has to be explained. The so-called non-line-of-sight errors are referred to as deviations between the measured distances and the actual distances. For example, a non-line-of-sight error $\eta_1$ corresponding to the base station 200(1) is equal to (r1–R1). Referring to FIG. 2 again, in terms of the base station 200(1), the corresponding non-line-of-sight error $\eta_1$ thereof is not greater than $\overline{AB}$ (viz., a distance between point A and point B) and $\overline{EF}$ (viz., a distance between point E and point F). Therefore, a maximum value of the non-line-of-sight error $\eta_1$ corresponding to the base station 200(1) may be expressed as:

$$\max(\eta_1) = \min\{\overline{AB}, \overline{EF}\}$$

Similarly, maximum values of non-line-of-sight errors $\eta_2$ and $\eta_3$ corresponding to the base station 200(2) and the base station 200(3) respectively may be expressed as:

$$\max(\eta_2) = \min\{\overline{AB}, \overline{CD}\}$$

$$\max(\eta_3) = \min\{\overline{CD}, \overline{EF}\}$$

Since $\eta_1 = r_1 - R_1 = (1-\alpha_1)r_1$, $\alpha_1 = 1 - \eta_1/r_1$. Thus, a minimum value of $\alpha_1$ may be expressed as:

$$\alpha_{1,min} = 1 - \frac{\max\{\eta_1\}}{r_1} = 1 - \frac{\min\{\overline{AB}, \overline{EF}\}}{r_1}.$$

In addition, according to FIG. 2, it shows that:

$$\overline{AB} = r_1 + r_2 - L_{12}$$

$$\overline{CD} = r_2 + r_3 - L_{23}$$

$$\overline{EF} = r_1 + r_3 - L_{13}$$

Since values of $\overline{AB}$, $\overline{CD}$ and $\overline{EF}$ are positive, the minimum value $\alpha_{1,min}$ of $\alpha_1$ may be rewritten as:

$$\alpha_{1,min} = \max\left\{1 - \frac{\overline{AB}}{r_1}, 1 - \frac{\overline{EF}}{r_1}\right\}$$

$$= \max\left\{\frac{L_{12} - r_2}{r_1}, \frac{L_{13} - r_3}{r_1}\right\}.$$

Similarly, minimum values $\alpha_{2,min}$ and $\alpha_{3,min}$ of $\alpha_2$ and $\alpha_3$ are respectively expressed as:

$$\alpha_{2,min} = \max\left\{\frac{L_{12} - r_1}{r_2}, \frac{L_{23} - r_3}{r_2}\right\},$$

and $$\alpha_{3,min} = \max\left\{\frac{L_{13} - r_1}{r_3}, \frac{L_{23} - r_2}{r_3}\right\}.$$

Therefore, the lower limit of the first variable α, the second variable β and the third variable γ may be expresses as:

$$v_{min} = [\alpha_{min} \beta_{min} \gamma_{min}]^T = [\alpha_{1,min}^2 \alpha_{2,min}^2 \alpha_{3,min}^2]^T.$$

Moreover, because the measured distances are always greater than the actual distance, the upper limit of the first variable α, the second variable β and the third variable γ may be expressed as:

$$v_{max} = [1 \; 1 \; 1]^T.$$

II. Determining Object Function

After determining the measurement circles 330(1) to 330(3), the processing circuit 120 or 310 determines the object function $F(\alpha, \beta, \gamma, \lambda)$, and this object function $F(\alpha, \beta, \gamma, \lambda)$ is expressed with the first variable α, the second variable β, the third variable γ, and the fourth variable λ.

Moreover, in an embodiment of the invention, when determining the object function $F(\alpha, \beta, \gamma, \lambda)$, the function f(v) and the constraint g(v) are initially determined, and then the object function $F(\alpha, \beta, \gamma, \lambda)$ is determined according to Lagrange multiplier; namely, a relationship between the object function $F(\alpha, \beta\gamma, \lambda)$, the function f(v) and the constraint g(v) is expressed by the following Equation (7):

$$F(\alpha, \beta, \gamma, \lambda) = f(v) + \lambda \times g(v) \quad (7)$$

wherein, $v = [\alpha \; \beta \; \gamma]^T$. Moreover, the function f(v) is determined according to the radiuses $r_1$ to $r_3$ of the three measurement circles 330(1) to 330(3), the coordinates of the three interception points U, V and W, and the coordinates of the three base stations 200(1) to 200(3). The constraint g(v) is then determined according to the radiuses $r_1$ to $r_3$ of the three measurement circles 330(1) to 330(3) and the distances $L_{12}$, $L_{13}$, and $L_{23}$ between the three base stations 330(1) to 330(3).

(1). Function f(v)

Referring to FIG. 2 again, if the coordinates of the intersection points U, V and W are (Ux,Uy), (Vx,Vy) and (Wx, Wy), respectively, and an actual horizontal coordinate and an actual vertical coordinate of the mobile device 100 are x and y, respectively, then a function f(x,y) using x and y as variables may be expressed as:

$$f(x,y)=(x-U_x)^2+(y-U_y)^2+(x-V_x)^2+(y-V_y)^2+(x-W_x)^2+(y-W_y)^2 \quad (8)$$

In addition, according to Equations (4) and (6), the followings can be obtained:

$$(x-x_1)^2+(y-y_1)^2=\alpha r_1^2 \quad (9)$$

$$(x-x_2)^2+(y-y_2)^2=\beta r_2^2 \quad (10)$$

$$(x-x_3)^2+(y-y_3)^2=\gamma r_3^2 \quad (11)$$

Respectively subtract Equations (9) and (11) from Equation (10), the followings can be obtained:

$$2(x_1-x_2)x+2(y_1-y_2)y=\beta r_2^2-\alpha r_1^2+K_1-K_2 \quad (12)$$

$$2(x_3-x_2)x+2(y_3-y_2)y=\beta r_2^2-\gamma r_3^2+K_3-K_2 \quad (13)$$

wherein, $$K_1=x_1^2+y_1^2$$

$$K_2=x_2^2+y_2^2$$

$$K_3=x_3^2+y_3^2$$

In addition, Equations (12) and (13) may be expressed in a matrix:

$$PQ = R \quad (14)$$

wherein, $$P = \begin{bmatrix} 2(x_1-x_2) & 2(y_1-y_2) \\ 2(x_3-x_2) & 2(y_3-y_2) \end{bmatrix}$$

$$Q = \begin{bmatrix} x \\ y \end{bmatrix}$$

$$R = \begin{bmatrix} \beta r_2^2 - \alpha r_1^2 + K_1 - K_2 \\ \beta r_2^2 - \gamma r_3^2 + K_3 - K_2 \end{bmatrix}$$

a solution of Equation (14) is:

$$Q = \begin{bmatrix} x \\ y \end{bmatrix} = P^{-1}R \quad (15)$$

The function f(v) may be converted from the function f(x,y), and by substituting Equation (15) into Equation (8), the function f(v) expressed with the first variable α, the second variable β and the third variable γ may be derived.

$$f(v) = v^T M v + N v + P \quad (16)$$

wherein, $$M = \begin{bmatrix} D_1 & D_4 & 0 \\ 0 & D_2 & D_5 \\ D_6 & 0 & D_3 \end{bmatrix}$$

$$N = \begin{bmatrix} D_7 & D_8 & D_9 \end{bmatrix}$$

$$P = D_{10}$$

$$D_1 = 12(b^2 + d^2)\frac{r_1^4}{K_d^2}$$

$$D_2 = 12(a^2 + b^2 + c^2 + d^2 - 2ab - 2cd)\frac{r_2^4}{K_d^2}$$

$$D_3 = 12(a^2 + c^2)\frac{r_3^4}{K_d^2}$$

$$D_4 = -24(b^2 + d^2 - ab - cd)\frac{r_1^2 r_2^2}{K_d^2}$$

$$D_5 = -24(a^2 + c^2 - ab - cd)\frac{r_2^2 r_3^2}{K_d^2}$$

$$D_6 = -24(ab + cd)\frac{r_1^2 r_3^2}{K_d^2}$$

$$D_7 = (-24(b^2 + d^2)(K_1 - K_2) + 24(ab + cd)(K_3 - K_2) - 2dS_x K_d^2 + 2bS_y K_d^2))\frac{r_1^2}{K_d^2}$$

$$D_8 = (24(b^2 + d^2)(K_1 - K_2) + 24(a^2 + c^2)(K_3 - K_2) - 24(ab + cd)(K_1 + K_3 - 2K_2) + 2K_d^2(aS_y - bS_y - cS_x + dS_x))\frac{r_2^2}{K_d^2}$$

$$D_9 = (-24(a^2 + c^2)(K_3 - K_2) + 24(ab + cd)(K_1 - K_2) - 2cS_x K_d^2 + 2aS_y K_d^2))\frac{r_3^2}{K_d^2}$$

$$D_{10} = (12(b^2 + d^2)(K_1 - K_2)^2 + 12(a^2 + c^2)(K_3 - K_2)^2 - 24(ab + cd)(K_1 - K_2)(K_3 - K_2) + 2K_d^2((aS_y - cS_x)(K_3 - K_2) - (bS_y - dS_x)(K_1 - K_2) + K_d^2 S_{xy}))/K_d^2$$

and $$a = x_1 - x_2$$

$$b = x_3 - x_2$$

$$c = y_1 - y_2$$

$$d = y_3 - y_2$$

$$K_d = 4(ad - bc)$$

$$S_x = -2\frac{U_x + V_x + W_x}{K_d}$$

$$S_y = -2\frac{U_y + V_y + W_y}{K_d}$$

$$S_{xy} = U_x^2 + V_x^2 + W_x^2 + U_y^2 + V_y^2 + W_y^2$$

(2). Constraint g(v)

Figure 3:
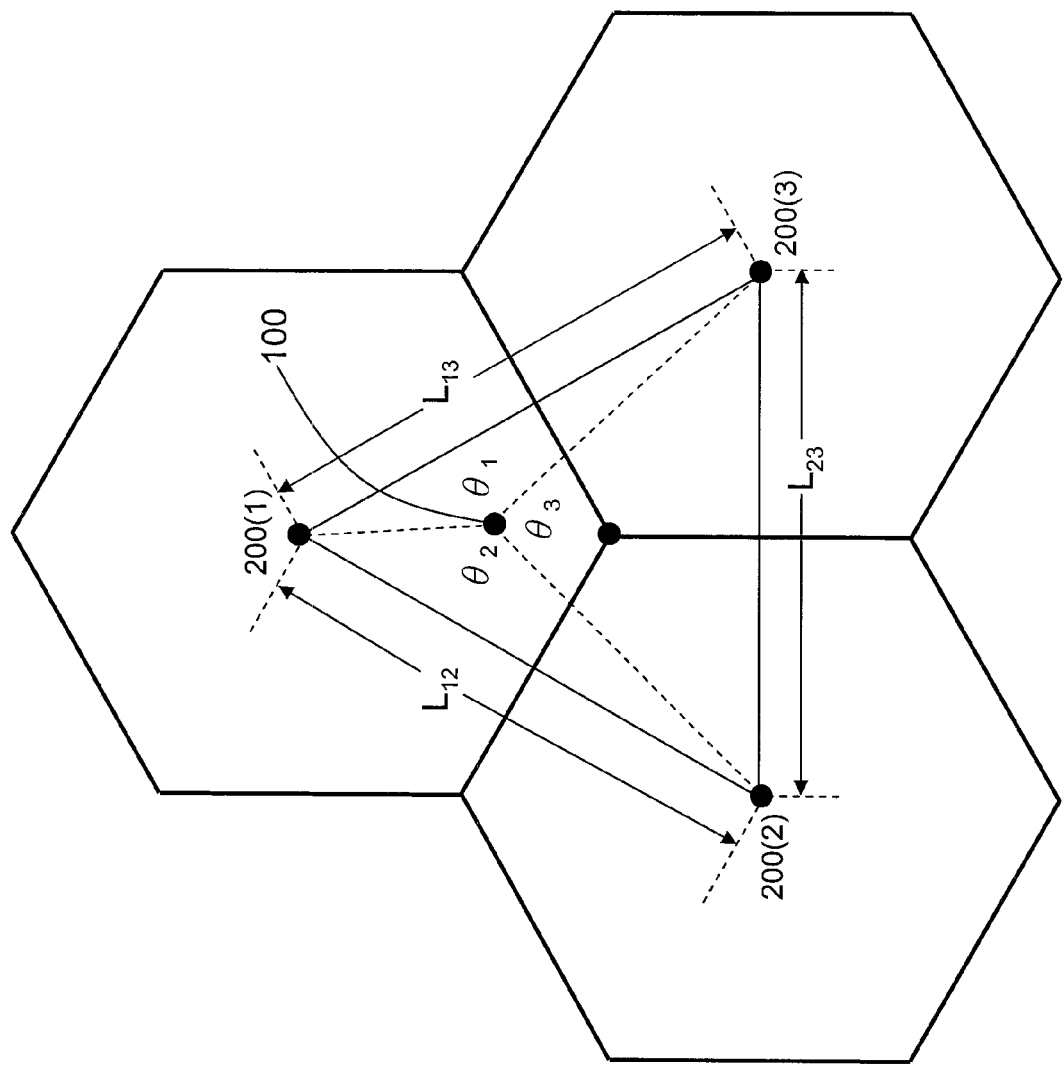
FIG. 3 is a honeycomb diagram of actual distances between base stations and a mobile device illustrated in FIG. 2.

Referring to FIG. 3, FIG. 3 is a honeycomb diagram of the actual distances between the base stations 200(1) to 200(3) and the mobile device 100 illustrated in FIG. 2. Wherein, according to a geometric relationship, the following geometric constraint (17) is met:

$$\cos \theta_1 = \cos(2\pi - \theta_2 - \theta_3) = \cos(\theta_2 + \theta_3) \quad (17)$$

After squaring of both sides of the geometric constraint (17), according to the trigonometric formula, the following can be obtained:

$$\cos^2\theta_1 + \cos^2\theta_2 + \cos^2\theta_3 - 2\cos\theta_1 \cos\theta_2 \cos\theta_3 - 1 = 0 \quad (18)$$

In addition, according to Law of Cosines, the following can be obtained:

$$\cos\theta_1 = \frac{R_1^2 + R_3^2 - L_{13}^2}{2R_1R_3} \quad (19)$$

$$\cos\theta_2 = \frac{R_1^2 + R_2^2 - L_{12}^2}{2R_1R_2} \quad (20)$$

$$\cos\theta_3 = \frac{R_2^2 + R_3^2 - L_{23}^2}{2R_2R_3} \quad (21)$$

Equations (19) to (21) are substituted into Equation (18) to perform simple algebraic computation, and by standardizing $L_{12}{}^2L_{23}{}^2L_{13}{}^2$ to derive a non-linear constraint g(v) among the first variable α, the second variable β and the third variable γ. The constraint g(v) is expressed as:

$$g(v) = v^T H v + G v + 1 = 0 \quad (22)$$

wherein, $$H = \begin{bmatrix} C_1 & C_4 & 0 \\ 0 & C_2 & C_5 \\ C_6 & 0 & C_3 \end{bmatrix}$$

$$G = \begin{bmatrix} C_7 & C_8 & C_9 \end{bmatrix}$$

and $$C_1 = \frac{r_1^4}{L_{12}^2 L_{13}^2}$$

$$C_2 = \frac{r_2^4}{L_{12}^2 L_{23}^2}$$

$$C_3 = \frac{r_3^4}{L_{13}^2 L_{23}^2}$$

$$C_4 = r_1^2 r_2^2 \left( \frac{1}{L_{13}^2 L_{23}^2} - \frac{1}{L_{12}^2 L_{23}^2} - \frac{1}{L_{13}^2 L_{12}^2} \right)$$

$$C_5 = r_2^2 r_3^2 \left( \frac{1}{L_{13}^2 L_{12}^2} - \frac{1}{L_{12}^2 L_{23}^2} - \frac{1}{L_{13}^2 L_{23}^2} \right)$$

$$C_6 = r_1^2 r_3^2 \left( \frac{1}{L_{12}^2 L_{23}^2} - \frac{1}{L_{13}^2 L_{23}^2} - \frac{1}{L_{13}^2 L_{12}^2} \right)$$

$$C_7 = r_1^2 \left( \frac{L_{23}^2}{L_{12}^2 L_{13}^2} - \frac{1}{L_{13}^2} - \frac{1}{L_{12}^2} \right)$$

$$C_8 = r_2^2 \left( \frac{L_{13}^2}{L_{12}^2 L_{23}^2} - \frac{1}{L_{12}^2} - \frac{1}{L_{23}^2} \right)$$

$$C_9 = r_3^2 \left( \frac{L_{12}^2}{L_{13}^2 L_{23}^2} - \frac{1}{L_{13}^2} - \frac{1}{L_{23}^2} \right).$$

III. Deriving Best Solution of α, β, γ, and λ

In order to derive the best solution of the first variable α, the second variable β, the third variable γ, and the fourth variable λ, iterations of a genetic algorithm are performed to obtain a minimum operand value of the object function F(α,β,γ,λ). When the object function F(α,β,γ,λ) has the minimum operand value, the corresponding first variable α, second variable β, third variable γ, and fourth variable λ thereof are namely the best solution.

The genetic algorithm is provided by John Holland, and is one of the most important iterative calculation methods which has recently been widely applied for solving optimization problems. The genetic algorithm has been used in a considerable number of fields, such as control engineering, aerospace, image processing, structural analysis, and so forth. For executing the genetic algorithm, an initial population must be determined, firstly. The genetic algorithm often adopt a binary calculation, and thus that multiple genes in each population are expressed with binary serials. Each generation of genes has a certain probability of surviving till the next generation, which is depending on good and bad of the genes. Afterword, the most suitable genes are obtained through continuous iterative cycles. The genetic algorithm imitates the survival rules of nature, through reproduction, crossover and mutation processings, to enable the next generation of chromosomes to be better and superior. Generally, approximately ten times of iterative calculations have to be performed for the genetic algorithm in one time, and numbers of iterations depend on the complexity of a problem.

The genetic algorithm includes three main mechanisms: reproduction, crossover and mutation. Regardless of the problem which is to request a maximum value or a minimum value, the genetic algorithm utilizes the above mechanisms to find extreme values. Real parts of the variables have to firstly go through a proper coding, and then after go through a randomly generated initial population, so as to determine a probability of existence of each chromosome in the next generation of population according to the operand values of different chromosomes in correspondence to the object function. Furthermore, the algorithm in combination with the crossover and the mutation mechanisms is able to search a specified range more efficiently.

(1) Coding

As previously mentioned, a binary coding is one of the most commonly used coding methods due to the convenience in performing the crossover and mutation. Before the coding starts, a coding length and a variable range are firstly determined, and the algorithm is then converting real numbers into binary numbers. It can be imagined that a variable has upper and lower limits, viz. the variable range, and the coding length L averagely divides the variable range into $(2^L-1)$ equal portions. Table 1 is a simple example demonstrating a variable z from 0 to 25 with a coding length of 3.

TABLE 1

Conversion between real numbers and binary serials.

| Binary serials | Real numbers |
|---|---|
| 000 | 0 |
| 001 | 3.5714 |
| 010 | 7.1429 |
| 011 | 10.7143 |
| 100 | 14.2857 |
| 101 | 17.8571 |
| 110 | 21.4286 |
| 111 | 25 |

A mathematical formula of the conversion may be expressed as:

$$z = B \times \frac{(U_B - L_B)}{2^L - 1} + L_B.$$

Z represents a value of the real number, B is the binary coding, L is the coding length, UB and LB respectively represent the upper and lower limits of the variable. Since the object function F(α,β,γ,λ) includes four variables α, β, γ, and λ, in order to derive the best solution of the object function F(α,β,γ,λ), the first variable α, the second variable β, the third variable γ, and the fourth variable λ have to be coded, respectively.

According to the above descriptions, the upper limit and the lower limit of the first variable α are $α_{min}$ and 1, respectively, the upper limit and the lower limit of the second variable β are $β_{min}$ and 1, respectively, and the upper limit and the lower limit of the third variable γ are $γ_{min}$ and 1, respectively. Furthermore, $0<α≤1$, $0<β≤1$ and $0<γ≤1$. The first variable coding range is $α_{min}$ to 1, the second variable coding range is $β_{min}$ to 1 and the third variable coding range is $γ_{min}$ to 1. Moreover, the first variable α may be coded with the coding length of M bits to perform the binary coding, so as to express the $(2^M-1)$ segments between $α_{min}$ to 1. Similarly, the second variable β may be coded with the coding length of N bits to perform the binary coding, so as to express the $(2^N-1)$ segments between $β_{min}$ to 1. The third variable γ may be coded with the coding length of O bits to perform the binary coding, so as to express the $(2^O-1)$ segments between the $γ_{min}$ to 1.

Moreover, according to the aforementioned descriptions regarding to the lower limit $α_{min}$, $β_{min}$ and $γ_{min}$, $$α_{1,min} = \max\left\{\frac{L_{12}-r_2}{r_1}, \frac{L_{13}-r_3}{r_1}\right\}$$

$$α_{2,min} = \max\left\{\frac{L_{12}-r_1}{r_2}, \frac{L_{23}-r_3}{r_2}\right\}$$

$$α_{3,min} = \max\left\{\frac{L_{13}-r_1}{r_3}, \frac{L_{23}-r_2}{r_3}\right\}$$

the first variable coding range (i.e. $α_{min}$ to 1), the second variable coding range (i.e. $β_{min}$ to 1) and the third variable coding range (i.e. $γ_{min}$ to 1) are determined according to the radiuses of the three measurement circles $r_1$, $r_2$ and $r_3$, and the distances $L_{12}$, $L_{13}$ and $L_{23}$ between the three base stations.

As for the fourth variable λ, the coding range thereof has no specific limitation. In an embodiment of the invention, the lower limit and the upper limit of the fourth variable λ are $λ_{min}$ and $λ_{max}$, respectively, and thus the coding range is $λ_{min}$ to $λ_{max}$. The fourth variable may be coded with the coding length of P bits to perform the binary coding, so as to express the $(2^P-1)$ segments between the $λ_{min}$ to $λ_{max}$.

In an embodiment of the invention, M is equal to N and O, and P is greater than M, N and O. In other words, in the present embodiment, the first variable α, the second variable β and the third variable γ have the same coding length, while the coding length of the fourth variable λ is greater than the coding length of the first variable α, the second variable β and the third variable γ.

(2) Initial Population

After the coding method is determined, a determination of the initial population can be started. The beginning of the initial population may be realized with a random binary serial generator. The size of the initial population shows that how many chromosomes exist in the initial population, whereas each chromosome represents a value, and also a binary serial.

In an embodiment of the invention, the processing circuit 120 or 310 respectively selects a plurality of combinations of the first variable α, the second variable β, the third variable γ, and the fourth variable λ, within the first variable coding range $α_{min}$ to 1. the second variable coding range $β_{min}$ to 1, the third variable coding range $γ_{min}$ to 1, and the fourth variable coding range $λ_{min}$ to $λ_{max}$ as the initial population (or the so-called "parent population") of the object function $F(α,β,γ,λ)$. Wherein, each combination of the first variable α, the second variable β, the third variable γ, and the fourth variable λ is coded with the coding length of (M+N+O+P) bits, and a coding rule thereof is according to abovementioned descriptions. In each combination, a value of the first variable α is represented by M bits, a value of the second variable β is represented by N bits, a value of the third variable γ is represented by O bits, and a value of the fourth variable λ is represented by P bits. In other words, M, N, O, and P bits in each combination respectively correspond to the first variable α, the second variable β, the third variable γ, and the fourth variable λ.

After the parent population (initial population) is determined, the iterations of the genetic algorithm are performed by using the parent population as a basis. The iterations of the genetic algorithm mainly include the following two steps:

(a) performing one or more of the chromosome reproduction processing, the crossover processing and the mutation processing on the combinations in the parent population to generate the plurality of combinations of the first variable α, the second variable β, the third variable γ, and the fourth variable λ; and (b) using the sub-population as a next generation of the parent population and repeating step (a) until a predetermined number of the iterations is achieved.

Figure 4:
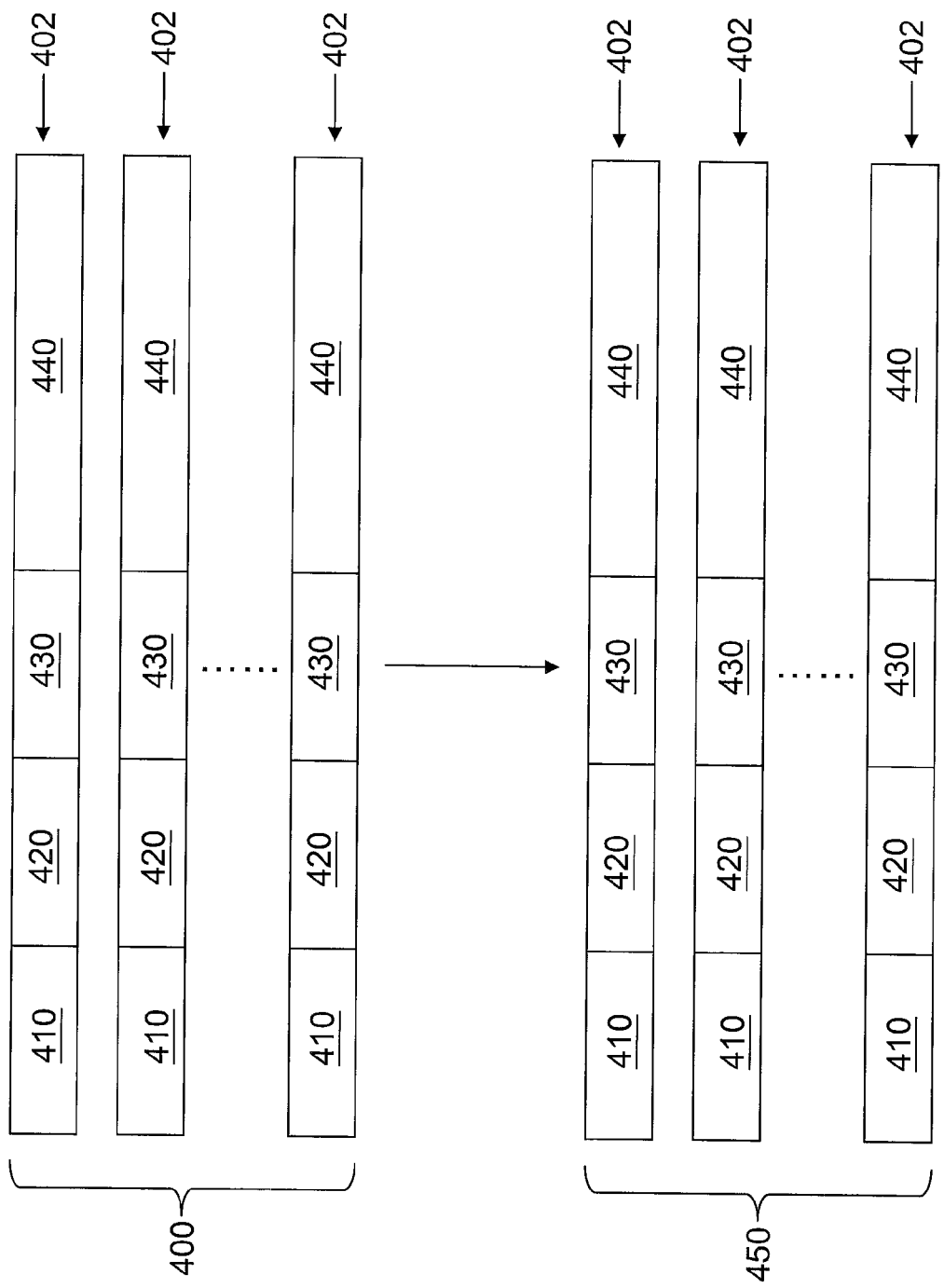
FIG. 4 is a schematic diagram of a parent population and a sub-population in an embodiment of the invention.

Referring to FIG. 4, FIG. 4 is a schematic diagram of a parent population 400 and a sub-population 450 in an embodiment of the invention. The parent population 400 and the sub-population 450 each includes a plurality of combinations 402, and each combination 402 may be regarded as a chromosome. The sub-population 450 is generated after one or more of the chromosome reproduction processing, the crossover processing and the mutation processing is performed on the combinations 402 in the parent population 400. Wherein, a number of the combinations 402 in the parent population 400 is equal to a number of the combinations 402 in the sub-population 450. Each combination 402 has a first region 410, a second bit region 420, a third bit region 420, and a fourth bit region 440. The first bit region 410 is for recording the first variable α represented by M bits. Similarly, the second bit region 420 is for recording the second variable β represented by N bits. The third bit region 430 is for recording the third variable γ represented by O bits. The fourth bit region 440 is for recording the fourth variable λ represented by P bits.

(3) Object Function

The object function is designed for solving an optimization problem. The genetic algorithm determines a probability of surviving of each chromosome according to the mathematical computation of the object function. For example, in a problem of searching for a maximum value, each chromosome is respectively substituted into the object function for computing, and the chromosome with the larger value has a greater chance to be remaining in the next generation. In the invention, the object function is namely the aforementioned Equation (7):

$$F(α,β,γ,λ)=f(v)+λ×g(v).$$

The following describes the three main mechanisms of the genetic algorithm, which includes the reproduction, the crossover and the mutation.

(4) Reproduction

As described in the last paragraph above, the probability of surviving of each chromosome is determined according to the operand value of the object function. One of the most commonly used methods is called a "disc method". It can be imagined that a circle is cut into a plurality of small fans by each chromosome, and according to the probability of surviving of each chromosome, the higher the probability of surviving, the larger the surface areas of the fans. In other word, during the chromosome reproduction processing, the processing circuit 120 or 310 respectively substitutes all the combinations 402 in the parent population 400 into the object function F(α,β,γ,λ), so as to derive the operand value of each combination 402. Then, the processing circuit 120 or 310, according to the probability corresponding to the operand value of each combination 402, replicates the combination 402 from the parent population 400 as a portion of the combination 402 in the sub-population 450. Wherein, the combinations 402 with the smaller operand values have larger probabilities of being selected from the parent population 400 to perform the replication.

(5) Crossover

Figure 5:
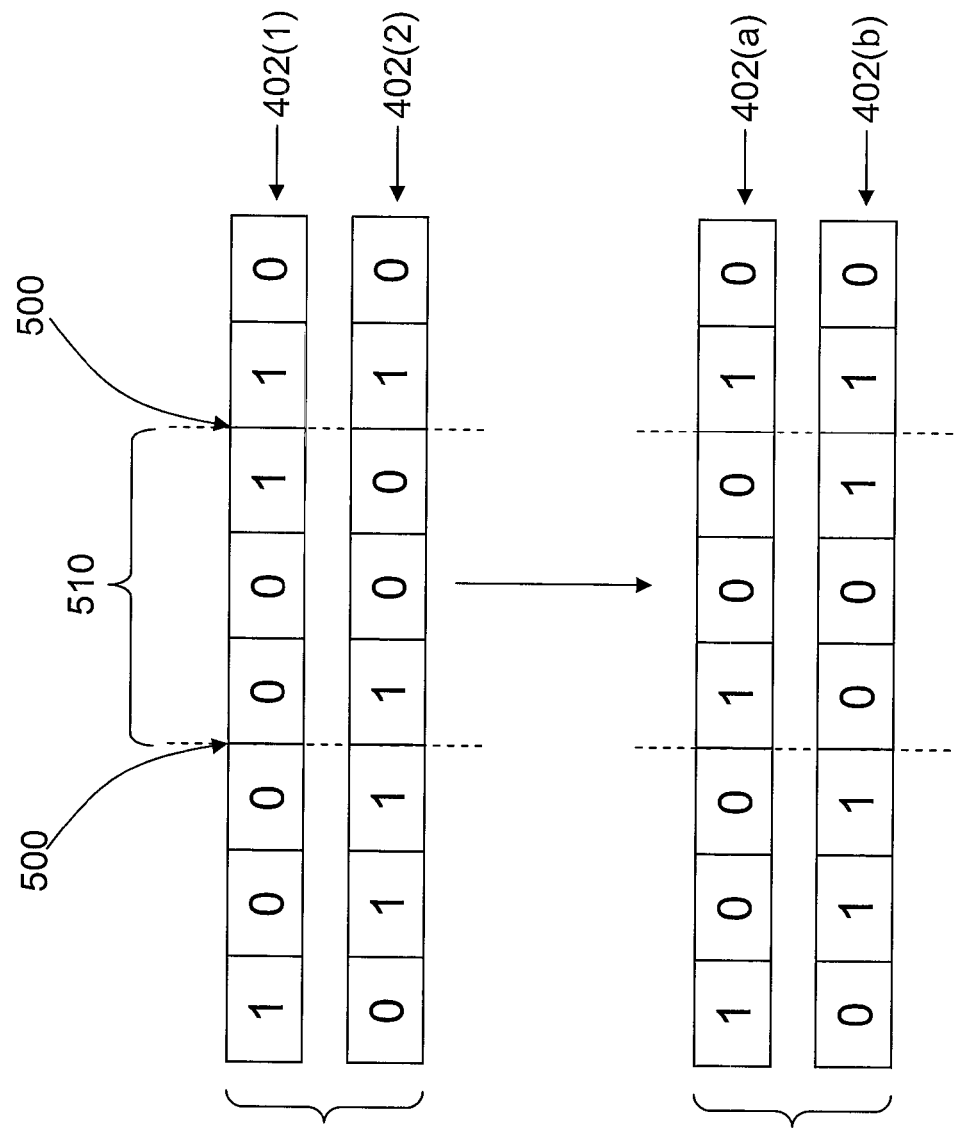
FIG. 5 is illustrated to describe a crossover processing performed in an embodiment of the invention.

In the next generation of population, not every chromosome must be generated through the reproduction processing. Herein the method of crossover is described. The crossover is divided into one-point crossover, two-point crossover and uniform crossover. Generally, the two-point crossover is the most representative and is considered to be a method with favorable results. The following provides a simple example; as shown in FIG. 5, during the crossover processing, two combinations 402(1) and 402(2) are randomly selected from the plurality of combinations 402 in the parent population 402. Wherein, for the convenience of the description, every combination in FIG. 5 each includes eight bits, but the invention is not limited thereto. Those skilled in the art would understand that the coding length of every combination may be other number of bits as long as it is subjected to the aforementioned coding rule. In the present embodiment, the processing circuit 120 or 310 determines one or two crossover points to perform the crossover processing. Taking FIG. 5 for example, the processing circuit 120 or 310 selects two crossover points 500. The two crossover points 500 are randomly generated by the processing circuit 120 or 310, and local codings 510 in two randomly selected combinations 402(1) or 402(2) are interchanged to generated two combinations 402(a) and 402(b) in the sub-population 450.

(6) Mutation

Figure 6:
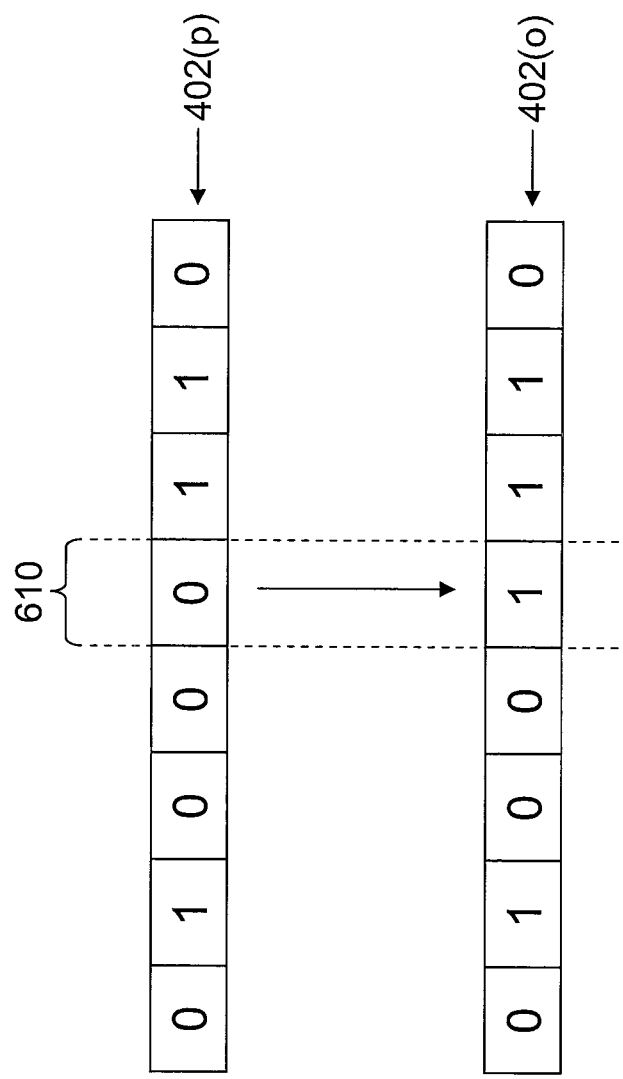
FIG. 6 is illustrated to describe a mutation processing performed in an embodiment of the invention.

Mutation is the third mechanism for generating the next generation of population which is capable of preventing the genetic algorithm from falling into a partial of the best solution rather than an entire search range of the best solution. The mutation allows the chromosomes (or "the combinations") to undergo changes. As shown in FIG. 6, during the mutation processing, the processing circuit 120 or 310 randomly selects at least one combination 402(p) from the combinations 420 in the parent population 400, and phase reverses at least one bit within the at least one combination 402(p) to generate a combination 402(o) in the sub-population 450. Taking FIG. 6 as an example, the processing circuit 120 or 310 phase reverses a bit in a segment 610 of the combination 402(p) and maintains the values of other bits in the combination 402(p), and thus generates the combination 402(o) in the sub-population 450.

(7) Best Solution

Through the iterations of the genetic algorithm, a minimum operand value of the object function F(α,β,γ,λ) may be obtained. When the object function F(α,β,γ,λ) has the minimum operand value, the corresponding first variable α, second variable β, third variable γ, and fourth variable λ thereof are the best solution. When the best solution of the first variable α, the second variable β, the third variable γ, and the fourth variable λ is derived, the coordinates (x,y) of the mobile device 100 can be promptly derived according to, for example, the aforementioned Equation (15).

$$Q = \begin{bmatrix} x \\ y \end{bmatrix} = P^{-1}R$$

wherein, $$P = \begin{bmatrix} 2(x_1 - x_2) & 2(y_1 - y_2) \\ 2(x_3 - x_2) & 2(y_3 - y_2) \end{bmatrix}$$

$$R = \begin{bmatrix} \beta r_2^2 - \alpha r_1^2 + K_1 - K_2 \\ \beta r_2^2 - \gamma r_3^2 + K_3 - K_2 \end{bmatrix}.$$

Thus, the processing circuit 120 or 310 can promptly position the mobile device 100 in the wireless wide area network.

Figure 7:
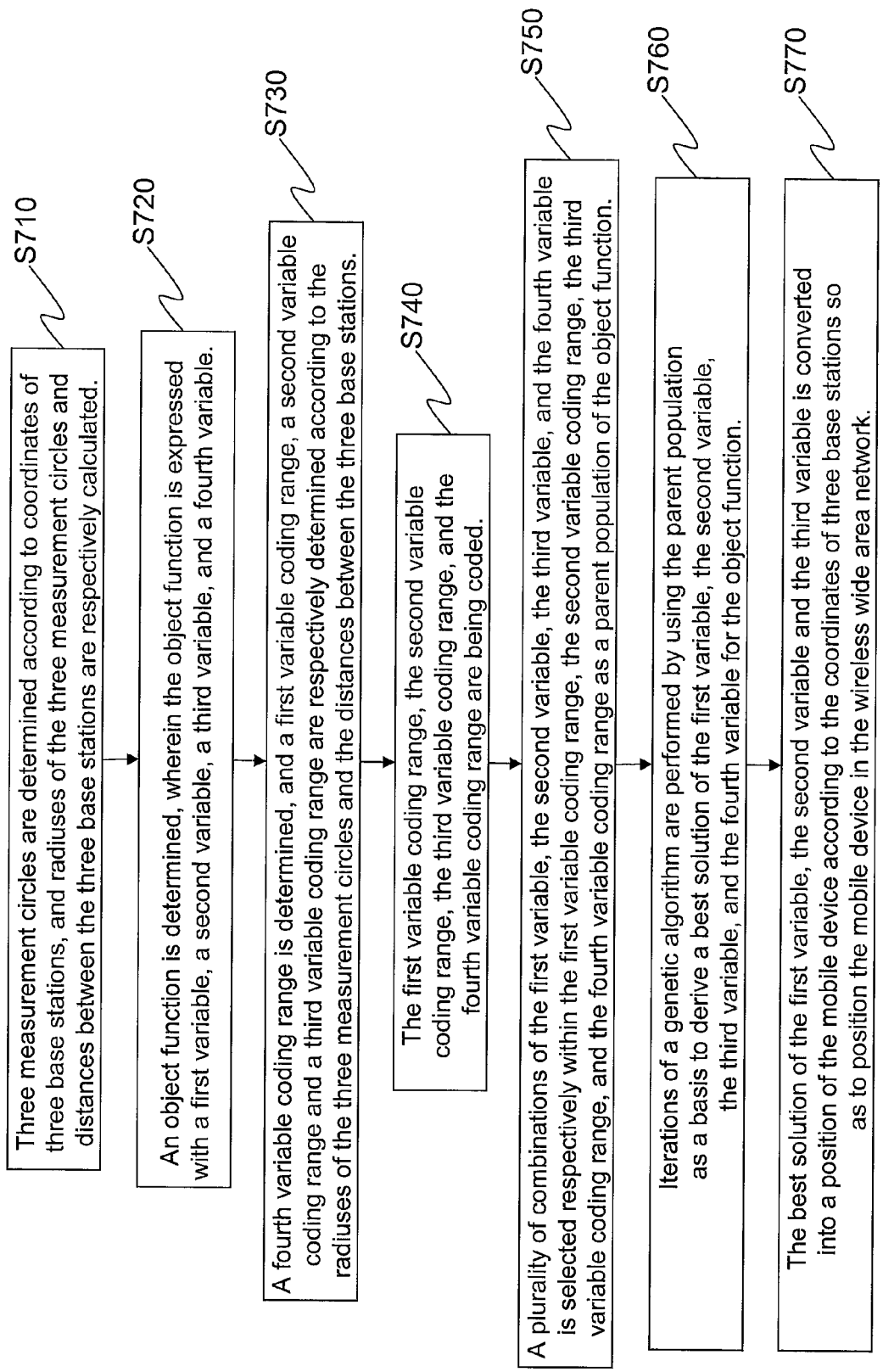
FIG. 7 is a flow chart diagram of a method for positioning a mobile device according to an embodiment of the invention.

Referring to FIG. 7, FIG. 7 is a flow chart diagram of a method for positioning a mobile device according to an embodiment of the invention. In step S710, three measurement circles are determined according to coordinates of three base stations, and radiuses of the three measurement circles and distances between the three base stations are respectively calculated. In step S720, an object function is determined, wherein the object function is expressed with a first variable, a second variable, a third variable, and a fourth variable. In step S730, a fourth variable coding range is determined, and a first variable coding range, a second variable coding range and a third variable coding range are respectively determined according to the radiuses of the three measurement circles and the distances between the three base stations. In step S740, the first variable coding range, the second variable coding range, the third variable coding range, and the fourth variable coding range are being coded. In step S750, a plurality of combinations of the first variable, the second variable, the third variable, and the fourth variable is selected respectively within the first variable coding range, the second variable coding range, the third variable coding range, and the fourth variable coding range as a parent population of the object function. In step S760, iterations of a genetic algorithm is performed by using the parent population as a basis to derive a best solution of the first variable, the second variable, the third variable, and the fourth variable for the object function. In step S770, the best solution of the first variable, the second variable and the third variable is converted into a position of the mobile device according to the coordinates of three base stations so as to position the mobile device in the wireless wide area network. Details about the steps S710 to S770 may be analogized according to other embodiments described in the above, and thus, for the sake of brevity, are not repeated herein.

Although, the above embodiment has taken three base stations as an example for the purpose of description, the invention is not limited thereto. The method for positioning the mobile device of the invention may also be used in the wireless wide area network of more base stations. When the mobile device to be positioned is located in a service range of three ore more base stations, the best solution of the first variable, the second variable and the third variable may be converted to the position of the mobile device through the above method and according to the coordinates of three base stations.

In summary, the embodiments of the method of the invention used the genetic algorithm, under the non-line-of-sight errors, to estimate the position of the mobile device. Through continuous iteration cycles, the genetic algorithm can find the best solution from the object function. In addition, according to actual simulation results, the embodiments of the method of the invention can indeed reduce an influence of the non-line-of-sight errors and provide a more accurate positioning.

It will be apparent to those skilled in the art that various modifications and variations may be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for positioning a mobile device in a wireless wide area network, wherein the method is executed by the mobile device or a server and the method comprise:

estimating distances from the mobile device to three base stations by measuring signals between the mobile device and the three base stations;

determining three measurement circles by respectively using the coordinates of three base stations as centers of the three measurement circles and the estimated distances as the radiuses of the three measurement circles;

determining an object function, wherein the object function is expressed with a first variable, a second variable, a third variable, and a fourth variable, wherein the first variable, the second variable, and the third variable are respectively related to a specific value of a measured distance and a actual distance from the mobile device to the three base stations, and the fourth variable is a coefficient of the object function;

respectively determining a first variable coding range, a second variable coding range and a third variable coding range according to the radiuses of the three measurement circles and the distances between the three base stations;

determining a fourth variable coding range;

coding the first variable coding range, the second variable coding range, the third variable coding range, and the fourth variable coding range;

selecting a plurality of combinations of the first variable, the second variable, the third variable, and the fourth variable respectively within the first variable coding range, the second variable coding range, the third variable coding range, and the fourth variable coding range as a parent population of the object function;

performing iterations of a genetic algorithm by using the parent population as a basis to derive a best solution of the first variable, the second variable, the third variable, and the fourth variable for the object function; and converting the best solution of the first variable, the second variable and the third variable into a position of the mobile device according to the coordinates of three base stations to position the mobile device in the wireless wide area network, wherein steps of determining the object function comprise:

determining a function f(v) according to the radiuses of the three measurement circles, coordinates of three interception points of the three measurement circles and the coordinates of three base stations; and determining a constraint g(v) according to the radiuses of the three measurement circles and the distances between the three base stations;

wherein the first variable, the second variable, the third variable, and the fourth variable are respectively expressed with $\alpha$, $\beta$, $\gamma$, and $\lambda$, while the object function is $F(\alpha,\beta,\gamma,\lambda)=f(v)+\lambda \times g(v)$, and $v=[\alpha\ \beta\ \gamma]T$.

2. The method for positioning the mobile device in the wireless wide area network as recited in claim 1, wherein the radiuses of the three measurement circles are r1, r2 and r3 respectively, the distances between the three base stations are L12, L13 and L23 respectively, the first variable coding range is $\alpha_{min}$ to 1, the second variable coding range is $\beta_{min}$ to 1, and the third variable coding range is $\gamma_{min}$ to 1;

wherein $[\alpha_{min}\ \beta_{min}\ \gamma_{min}]^T = [\alpha_{1,min}{}^2\ \alpha_{2,min}{}^2\ \alpha_{3,min}{}^2]^T$, $\alpha_{1,min}$ is the larger of $$\frac{L_{12}-r_2}{r_1} \text{ and } \frac{L_{13}-r_3}{r_1},$$

$\alpha_{2,min}$ is the larger of $$\frac{L_{12}-r_1}{r_2} \text{ and } \frac{L_{23}-r_3}{r_2},$$

and $\alpha_{3,min}$ is the larger of $$\frac{L_{13}-r_1}{r_3} \text{ and } \frac{L_{23}-r_2}{r_3}.$$

3. The method for positioning the mobile device in the wireless wide area network as recited in claim 2, wherein steps of coding the first variable coding range, the second variable coding range, the third variable coding range, and the fourth variable coding range comprise:

expressing (2M−1) segments between $\alpha_{min}$ to 1 with M bits;

expressing (2N−1) segments between $\beta_{min}$ to 1 with N bits;

expressing (2O−1) segments between $\gamma_{min}$ to 1 with O bits; and expressing (2P−1) segments between $\lambda_{min}$ to $\lambda_{max}$ with P bits, wherein the fourth variable coding range is $\lambda_{min}$ to $\lambda_{max}$, and M, N, O, and P are positive integers, and $\lambda_{min}$ is an lower limit of the fourth variable coding range and $\lambda_{max}$ is an upper limit of the fourth variable coding range.

4. The method for positioning the mobile device in the wireless wide area network as recited in claim 3, wherein M is equal to N and O, and P is greater than M, N and O.

5. The method for positioning the mobile device in the wireless wide area network as recited in claim 1, wherein steps of performing the iterations of the genetic algorithm by using the parent population as the basis comprise:

(a) performing one or more of a chromosome reproduction processing, a crossover processing and a mutation processing on the combinations in the parent population to generate a plurality of combinations of the first variable, the second variable, the third variable, and the fourth variable in a sub-population; and (b) using the sub-population as a next generation of the parent population and repeating step (a) until a predetermined number of the iterations is achieved.

6. The method for positioning the mobile device in the wireless wide area network as recited in claim 5, wherein the reproduction processing comprises:

respectively substituting the combinations in the parent population into the object function to derive an operand value of each combination; and replicating the combinations from the parent population as a portion of the combinations in the sub-population according to probabilities corresponding to the operand values of the combinations.

7. The method for positioning the mobile device in the wireless wide area network as recited in claim 6, wherein the combinations with smaller operand values have larger probabilities of being selected from the parent population to perform replication.

8. The method for positioning the mobile device in the wireless wide area network as recited in claim 5, wherein the crossover processing comprises:
    randomly selecting two combinations from the combinations in the parent population, and interchanging the local codings within the two selected combinations to generate two combinations in the sub-population.

9. The method for positioning the mobile device in the wireless wide area network as recited in claim 5, wherein the mutation processing comprises:
    randomly selecting at least one combination from the combinations with the parent population, and phase reversing at least one bit within the at least one combination to generate a combination in the sub-population.

10. A method for positioning a mobile device in a wireless wide area network (WWAN), wherein the method is executed by the mobile device or a server and the method comprises:
    estimating distances from the mobile device to a plurality of base stations by measuring signals between the mobile device and the plurality of base stations;
    determining a plurality of measurement circles by respectively using coordinates of a plurality of base stations as centers of the measurement circles and the estimated distances as the radiuses of the measurement circles;
    determining an object function, wherein the object function is expressed by a plurality of variables, wherein part of the variables are related to specific values of a measured distance and a actual distance from the mobile device to the plurality of base stations, and another part of the variables is a coefficient of the object function;
    respectively determining a plurality of variable coding ranges according to the radius of the plurality of measurement circles and the distances between the plurality of base stations;
    determining another variable coding range;
    coding the plurality of variable coding ranges;
    selecting a plurality of combinations of the plurality of variables respectively within the plurality of variable coding ranges as a parent population of the object function;
    performing iterations of a genetic algorithm using the parent population as a basis to derive a best solution of the plurality of variables for the object function; and
    converting the best solution of at least a part of the variables within the plurality of variables into a position of the mobile device according to the coordinates of the plurality of base stations to position the mobile device in the wireless wide area network,
    wherein steps of determining the object function comprise:
        determining a function f(v) according to the radiuses of the measurement circles, coordinates of interception points of the measurement circles and the coordinates of base stations; and
        determining a constraint g(v) according to the radiuses of the measurement circles and the distances between the base stations;
        wherein the variables are respectively expressed with α, β, γ, and λ, while the object function is $F(\alpha,\beta,\gamma,\lambda)=f(v)+\lambda \times g(v)$, and $v=[\alpha\ \beta\ \gamma]T$.

11. The method for positioning the mobile device in the wireless wide area network as recited in claim 10, wherein steps of performing the iterations of the genetic algorithm using the parent population as the basis comprise:
    (a) performing one or more of a chromosome reproduction processing, a crossover processing and a mutation processing on the combinations in the parent population to generate a plurality of combinations of the plurality of variables in a sub-population; and
    (b) using the sub-population as a next generation of the parent population and repeating step (a) until a predetermined number of the iterations is achieved.

12. The method for positioning a mobile device in a wireless wide area network as recited in claim 11, wherein the reproduction processing comprises:
    respectively substituting the combinations in the parent population into the object function to derive an operand value of each combination; and
    replicating the combinations from the parent population as a portion of the combinations in the sub-population according to probabilities corresponding to the operand values of the combinations.

13. The method for positioning the mobile device in the wireless wide area network as recited in claim 12, wherein the combinations with smaller operand values have larger probabilities of being selected from the parent population to perform replication.

14. The method for positioning the mobile device in the wireless wide area network as recited in claim 11, wherein the crossover processing comprises:
    randomly selecting two combinations from the combinations in the parent population, and interchanging local codings within the two selected combinations to generate two combinations in the sub-population.

15. The method for positioning the mobile device in the wireless wide area network as recited in claim 11, wherein the mutation processing comprises:
    randomly selecting at least one combination from the combinations with the parent population, and phase reversing at least one bit within the at least one combination to generate a combination in the sub-population.

* * * * *